(12) United States Patent
Jonsson et al.

(10) Patent No.: US 7,207,920 B2
(45) Date of Patent: Apr. 24, 2007

(54) V-BELT CONTINUOUSLY VARIABLE TRANSMISSION FOR A VEHICLE ENGINE

(75) Inventors: John Jonsson, Krokom (SE); Rolf Jonsson, Östersund (SE)

(73) Assignee: Pivario AB, Krokom (SE)

( * ) Notice: Subject to any disclaimer, the term of this patent is extended or adjusted under 35 U.S.C. 154(b) by 151 days.

(21) Appl. No.: 10/954,171

(22) Filed: Oct. 1, 2004

(65) Prior Publication Data

US 2005/0090367 A1    Apr. 28, 2005

Related U.S. Application Data

(60) Provisional application No. 60/509,807, filed on Oct. 10, 2003.

(30) Foreign Application Priority Data

Oct. 1, 2003  (SE) .................................. 0302635

(51) Int. Cl.
*F16H 61/662*  (2006.01)
*F16H 61/664*  (2006.01)
(52) U.S. Cl. .............................. 477/44; 477/45; 477/50
(58) Field of Classification Search .................. 477/43, 477/44, 45, 50
See application file for complete search history.

(56) References Cited

U.S. PATENT DOCUMENTS

| 3,996,811 A | 12/1976 | Reese |
| 4,229,989 A | 10/1980 | Tamura |
| 4,241,618 A | 12/1980 | Smirl |
| 4,310,322 A | 1/1982 | Beck |
| 4,585,429 A | 4/1986 | Marier |
| 4,585,430 A | 4/1986 | Gaddi |
| 4,589,858 A | 5/1986 | Gaddi |
| 5,334,102 A * | 8/1994 | Sato .............................. 474/18 |
| 6,800,049 B2 * | 10/2004 | Leising et al. ................. 477/39 |
| 2004/0116240 A1 * | 6/2004 | Taketsuna et al. ............. 476/41 |
| 2004/0254047 A1 * | 12/2004 | Frank et al. ................... 477/37 |

FOREIGN PATENT DOCUMENTS

| EP | 0 701 073 A2 | 3/1996 |
| EP | 1 471 289 A2 | 10/2004 |

* cited by examiner

*Primary Examiner*—Tisha Lewis
(74) *Attorney, Agent, or Firm*—Birch, Stewart, Kolasch & Birch, LLP

(57) ABSTRACT

A control device for controlling a V-belt CVT (Continuously Variable Transmission) which is connectible to a vehicle engine and comprises a primary variator and a secondary variator. The control device has a plurality of sensors which generate electronic measured values, comprising an engine speed sensor which generates a first measured value, and a power sensor which generates a second measured value which is related to the torque of an output drive shaft connected to the secondary variator. The control device further comprises an electronic control unit which is adapted to control the V-belt CVT based on said measured values.

A V-belt CVT having a control device as stated above, and a method for controlling such a V-belt CVT are also provided.

18 Claims, 5 Drawing Sheets

V-BELT CONTINUOUSLY VARIABLE TRANSMISSION FOR A VEHICLE ENGINE

This Non-provisional application claims priority under 35 U.S.C. § 119(e) on U.S. Provisional Application No(s). 60/509,807 filed on Oct. 10, 2003 and under 35 U.S.C. § 119(a) on Patent Application No(s). 0302635-8 filed in Sweden on Oct. 1, 2003, the entire contents of which are hereby incorporated by reference.

FIELD OF THE INVENTION

The present invention relates to a V-belt CVT (Continuously Variable Transmission) for a vehicle engine and a control device for such a CVT.

BACKGROUND ART

In many types of vehicle powered by an engine, the designer has selected a V-belt CVT. Such a transmission or drive comprises a primary variator and a secondary variator. The primary variator is connected to and driven by the crankshaft of the engine. The motion is transmitted by a V-belt to the secondary variator. The secondary variator is in turn connected to an output drive shaft that drives a wheel, belt, track or the like depending on the type of vehicle. Examples of vehicles where the V-belt CVT is used are light motorcycles and cross-country vehicles, such as three-wheel or four-wheel off-road motorcycles, weasels and snowmobiles.

The variator pulleys, on which the V-belt runs, each consist of two pulley halves. The relative distance of the pulley halves is variable so as to allow different gear ratios. Such shifting traditionally occurs automatically and continuously. As a rule the automatic function is established by the primary variator having a pulley with a fixed pulley half, i.e. which is fixedly connected to the crankshaft of the engine, and a movable pulley half, which is axially displaceable. The displacement of the movable pulley half is controlled by what is referred to as a centrifugal clutch with weight arms which, as the pulley rotates, strive to displace the movable pulley half so that the distance between the pulleys decreases. A return spring strives to pull the movable pulley half in the opposite direction. From an initial position with a stationary variator up to an engagement speed where the weight arms act on the movable pulley half by a force that exceeds the spring force, the distance between the pulleys is maximal. By replacing the spring by a spring with another spring constant and changing the design of the weight arms, it is possible to provide different engagement speeds and operating ranges.

The secondary variator also has a fixed pulley half and a movable pulley half. The movable pulley half is movable both axially and tangentially. A biasing spring presses the movable pulley half against the fixed pulley half and tangentially against a stop. A device with wedge-shaped cams is designed so that the movable pulley half must be displaced tangentially, i.e. rotated about the variator shaft to be able to be displaced axially from the fixed pulley half. This device makes the variator sensitive to torque. With no torque, or only a minor torque, on the output shaft of the variator, it is only necessary for the axial and tangential bias of the biasing spring to be overcome for the movable pulley half to be displaced from the fixed pulley half. With greater torques, greater friction is generated between the movable pulley half and the wedge-shaped cams. The increased friction cooperates with the biasing spring to keep the pulley halves together.

The construction of the primary variator with weight arms, that are actuated by the rotation and control the distance between the pulley halves, is self-regulating and besides results in a fixed operating behavior. It is in many cases desirable to be able to easily change the character of the drive.

An attempt to achieve this is disclosed in European Patent Application Publication No. 701 073, Piaggio et al. The object presented in EP 701 073 is to provide a V-belt CVT for a light motorcycle where the V-belt CVT in addition to the continuous operating mode also provides an operating mode where the driver can select a desired ear. This is achieved by an operating linkage which is connected to the movable pulley half of the primary variator and which is operated by a motorized cam element, which in turn is controlled by an electronic control unit. The driver can select manual or automatic shifting. In the former case, the driver himself increases or decreases the transmission ratio by a button on the handle bars. In both cases, it is the control unit that controls via the operating linkage the displacement of the movable pulley half, either according to a predetermined operating schedule or according to the driver's instructions. The initial setting of the primary variator, however, is still performed by means of a centrifugal clutch. In the automatic position, the control unit then controls the variator based on measured values of the speed of the engine and the position of the throttle lever.

The solution shown in EP 701 073 is certainly applicable to light motorcycles that are driven on roads. However, problems arise if you try to apply the solution to vehicles that are driven under more extreme operating conditions, such as three-wheel and four-wheel off-road motorcycles and snowmobiles, i.e. in the typical case cross-country vehicles. Such more extreme operating conditions comprise, for example, rapidly and sharply shifting friction between the drive wheel/drive belt/track and the ground. Under such conditions, the prior-art solution has difficulties in continuously providing optimal gear ratio.

SUMMARY OF THE INVENTION

The object of the invention is to provide a V-belt CVT which functions well also for vehicles that are driven under extreme operating conditions.

The object is achieved by a control device as claimed in claim 1 and a V-belt CVT as claimed in claim 9.

According to a first aspect of the invention, a control device is thus provided for controlling a V-belt CVT which is connectible to a vehicle engine and comprises a primary variator and a secondary variator. The control device has a plurality of sensors which generate electronic measured values, comprising at least an engine speed sensor which generates a first measured value, and a power sensor which generates a second measured value which is related to the torque of an output drive shaft connected to the secondary variator. The control device further comprises an electronic control unit which is adapted to control the V-belt drive based on said measured values.

According to a second aspect of the invention, a V-belt drive is provided, which is adapted to be connected to a vehicle engine, said V-belt drive comprising a primary variator and a secondary variator, and a control device for controlling the V-belt drive. The control device has a plurality of sensors which generate electronic measured values, comprising at least an engine speed sensor which generates a first measured value, and a power sensor which generates a second measured value, which is related to the torque of an output drive shaft connected to the secondary variator. The control device further comprises an electronic control unit which is adapted to control the V-belt CVT based on said measured values.

According to a third aspect of the invention, a control device is provided for controlling a V-belt CVT which is connectible to a vehicle engine and comprises a primary variator and a secondary variator. The control device comprises at least one sensor generating an electronic measured value. The one or more sensors are selected from a group of sensors comprising a primary speed sensor, sensing the engine speed or a speed proportional thereto, a secondary speed sensor, sensing the speed of the secondary variator or a speed proportional thereto, a power sensor generating a measured value related to the torque of an output drive shaft connected to the seconddary variator, and a throttle sensor. The control device further comprises an electronic control unit which is adapted to control the V-belt CVT based on said electronic measured value(s), and a clamping power actuator which is connected to the control unit and to the primary variator. The electronic control unit is adapted to set the V-belt clamping power of the primary variator by means of the clamping power actuator. According to a fourth aspect of the invention, a V-belt CVT is provided, which is adapted to be connected to a vehicle engine. The V-belt CVT comprises a primary variator and a secondary variator, and a control device according to said third aspect of the invention.

Thus, according to the invention, it has been realized that either by combining measured values of at least the speed of the vehicle engine and a magnitude which is related to the torque of the output shaft or by eliminating the centrifugal clutch of the primary variator and, instead, provide an electronically controlled actuator operating on the variator, it is possible to provide a considerably more controllable transmission which besides has considerably better relation to the operating conditions. For example, the friction against the ground, i.e. the grip, may suddenly practically disappear and then immediately become very high. Under such conditions the V-belt CVT can be set more accurately by a control device according to the invention than by using prior-art technique.

According to an embodiment of the control device according to the invention, the second measured value represents a V-belt clamping power of the primary variator. The pulley clamping power is a magnitude that is relatively easy to measure. It is also related to the torque of the output drive shaft by the clamping power of the primary variator acting on the pulley, which in turn cooperates with the secondary variator, which in turn is connected to the output drive shaft and on which the torque thereof is exerted. As described above, the movement of the movable pulley half of the secondary variator is determined by the output torque.

In one embodiment of the control device according to the invention, the second measured value represents the torque of the output drive shaft. The advantage of this measured value is that it gives direct information about the operating conditions prevailing on the output side of the CVT and enables a quickly acting control device.

In one embodiment of the control device according to the invention, the control unit is adapted to control the CVT so that a predetermined relationship between the measured values is achieved in each operating situation. This gives the advantage of a simple calculation which the control unit is to perform. It also facilitates the work for a person skilled in the art who is to design the character of the drive. Different templates or schedules for the operation, which give different characters, can easily be created by combining the measured values in different ways. This is used in one embodiment of the control device to allow it to be set in different operating modes which give different relationships between the measured values in a specific operating situation. This embodiment can advantageously be used as follows. A driver of a vehicle with an engine whose V-belt CVT is controlled by a control device according to the invention can be given an opportunity to set different operating modes by himself. Depending on the ground conditions, the driver's personality etc, an individual and situation-adapted setting of the character of the V-belt CVT can thus be provided. In contrast to the construction shown in EP 701 073, the change in the gear ratio of the CVT in response to a change of the operating conditions, such as friction against the ground, can thus be set. For instance, an increase or decrease of the gear ratio, i.e. shifting, may occur according to a steeper or flatter curve. Moreover, for instance said increase/decrease can occur at different degrees of steepness in different parts of a total operating range. This will be described and exemplified in more detail below.

In one embodiment, the control device according to the invention comprises a clamping power actuator which is connected to the control unit and adapted to set the pulley clamping power of the primary variator, in which case the control unit controls the actuator. By such controlled setting of the clamping power, the second measured value can be used in an advantageous manner.

In one embodiment of the control device, the control unit is adapted to command the clamping power actuator to cause engagement of the primary variator at a settable first engine speed and to set the actuator to maximum clamping power at a settable second engine speed. At least according to this embodiment, it is possible to simplify a primary variator of the above-described frequently used prior-art construction, implying that the centrifugal clutch can be excluded. Instead it will be the control unit that fully determines the position of the movable pulley half in relation to the fixed pulley half. The actuator actively performs the setting at all speeds in contrast to the engagement performed by the centrifugal clutch, which is disclosed in EP 701 073 and which is not settable for different speeds unless a mechanical modification of the primary variator is made. Thus, this embodiment results in more freedom in the designing of the character of the V-belt CVT. Both the first speed, i.e. the engagement speed, and the second speed, i.e. the maximum speed, are settable.

In one embodiment of the V-belt CVT, the primary variator comprises, like the above-described prior-art primary variators, a fixed pulley half which is fixedly connectible to the crankshaft of the engine, and a movable pulley shaft which is displaceably connectible to the crankshaft. Moreover the actuator comprises a holding-up means, which is arranged at a fixed distance from the fixed pulley half, a first operating arm which is connected to the movable pulley half, a second operating arm which is connected to the holding-up means, and a setting arm, which is adapted to set the distance between the operating arms. This embodiment has a robust construction of the actuator.

In one embodiment of the V-belt CVT, the setting arm is elongate and comprises spaced-apart first and second guide portions, which abut against abutment portions of the first and the second operating arm, respectively. The distance between the guide portions increases away from one end of the setting arm towards its other end, and the setting arm is displaceable back and forth in its longitudinal direction. Thus forcing the operating arms apart by means of the non-parallel guide portions of the setting arm can be resembled to driving a wedge between two parts and results in direct and powerful transmission of the setting power. Moreover this embodiment adds an additional control option by making it possible to select different degrees of steepness in the increase of the distance between the guide portions. For instance, by selecting a constant speed of the displacement of the setting arm in the longitudinal direction while providing a straight and a curved guide portion, the distance between the operating arms will be changed at different speeds depending on where along the guide portions the abutment against the abutment portions is positioned.

BRIEF DESCRIPTION OF THE DRAWINGS

The invention and additional advantages thereof will now be described in more detail by way of example and with reference to the accompanying drawings, in which.

DESCRIPTION OF EMBODIMENTS

Figure 1:
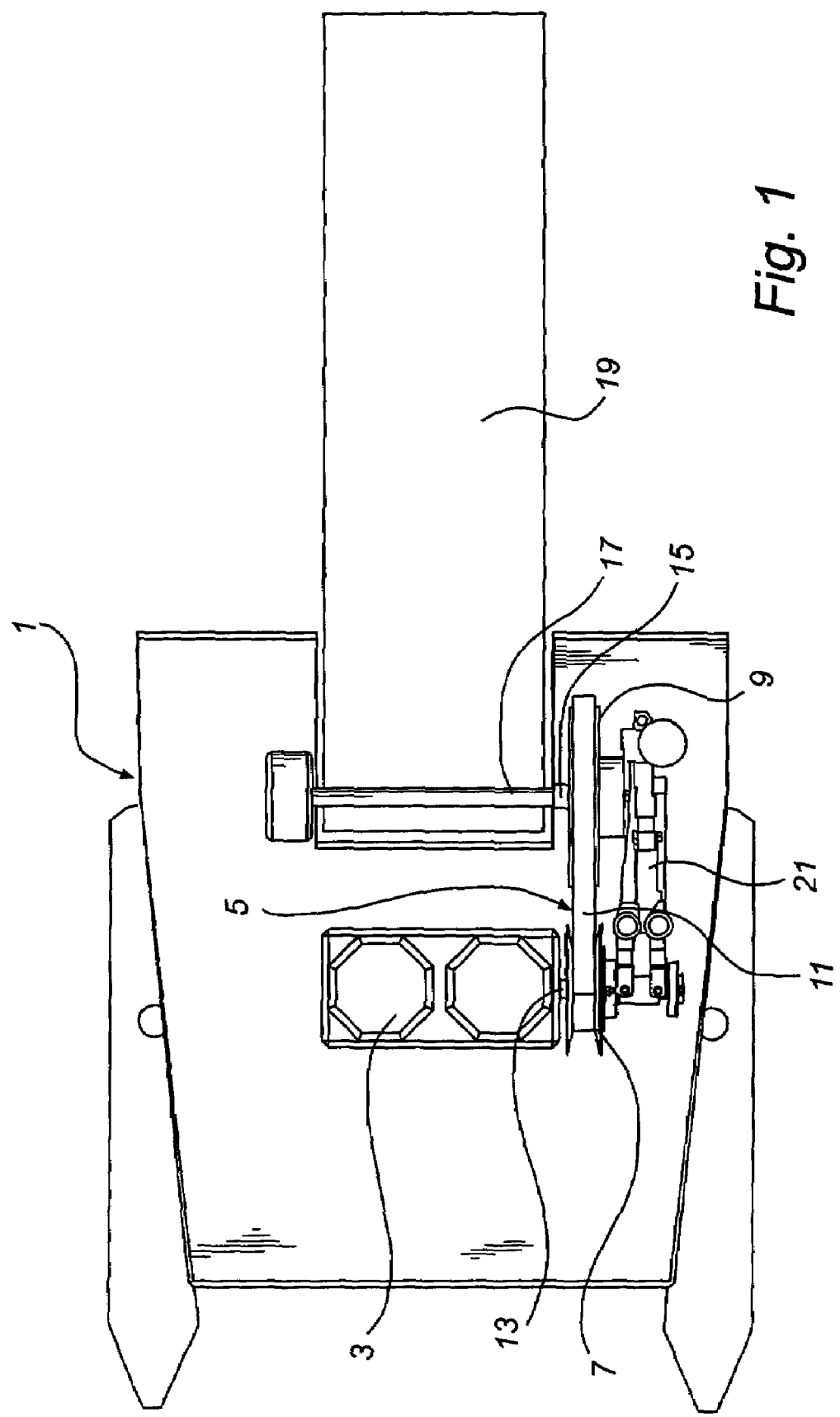
FIG. 1 is a highly schematic top plan view of a snowmobile with a V-belt CVT according to the invention.

For illustrating and exemplifying purposes, the invention will be described in more detail in a realization in the form of a snowmobile, as shown highly schematically in FIG. 1, where some schematic contours of parts of a snowmobile are drawn. The snowmobile 1 is provided with a four-stroke internal combustion engine 3. The engine 3 is connected to a V-belt CVT 5 which comprises a primary variator 7, a secondary variator 9 and a V-belt 11. The primary variator 7 is connected to a driving shaft of the engine 3, more specifically the crankshaft 13 of the engine. The secondary variator is connected to a driven shaft 15 which in turn is connected to an output drive shaft 17. The output drive shaft 17 makes a track 19 run over support rollers. The track 19 is in contact with the ground, which preferably consists of snow, and while rotating propels the snowmobile. A clamping power actuator 21, which most of the time is below merely referred to as an actuator, according to a currently preferred embodiment, is connected to the primary variator 7 for setting the same.

Figure 2:
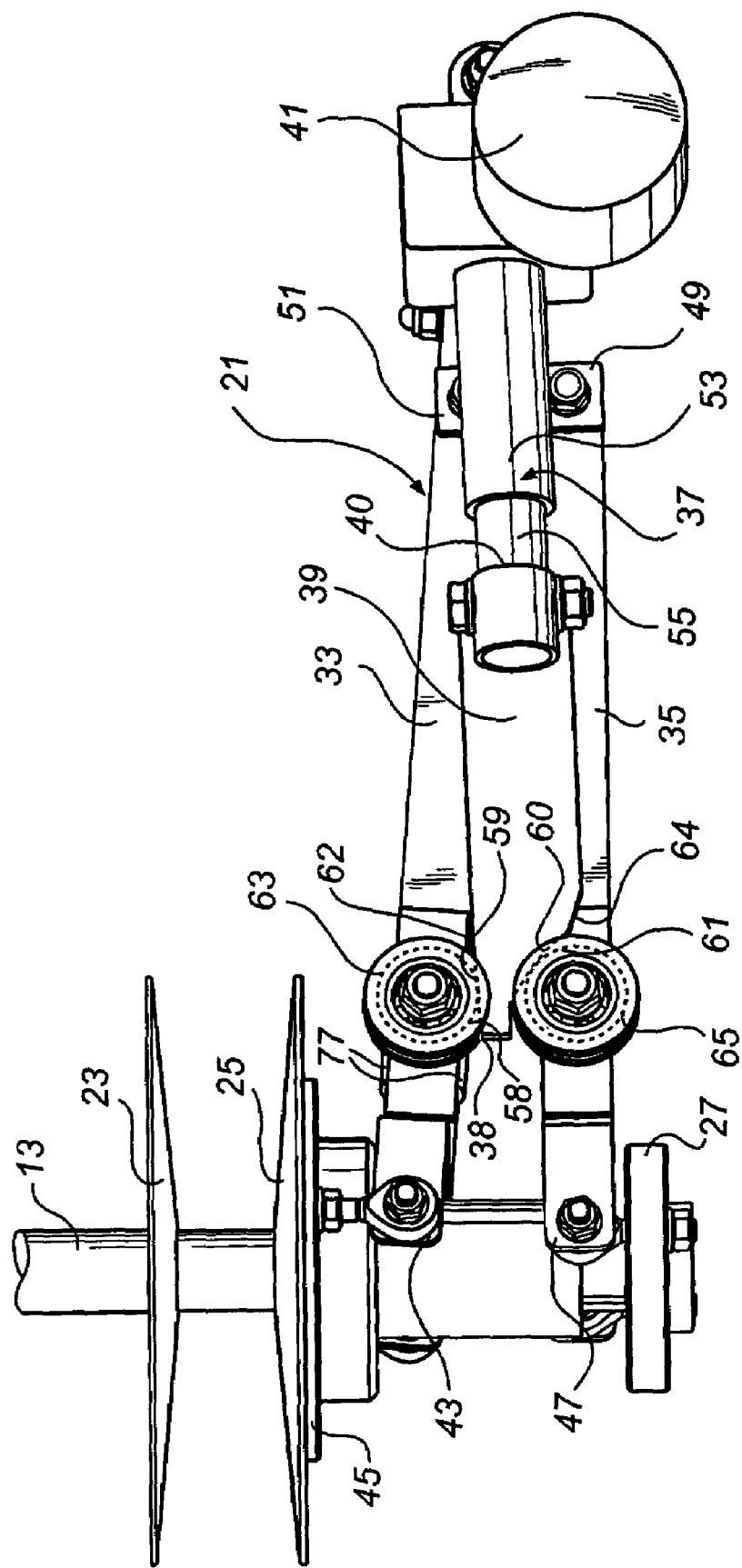
FIG. 2 is a schematic view seen obliquely from above of an embodiment of an actuator according to the invention.
Figure 3:
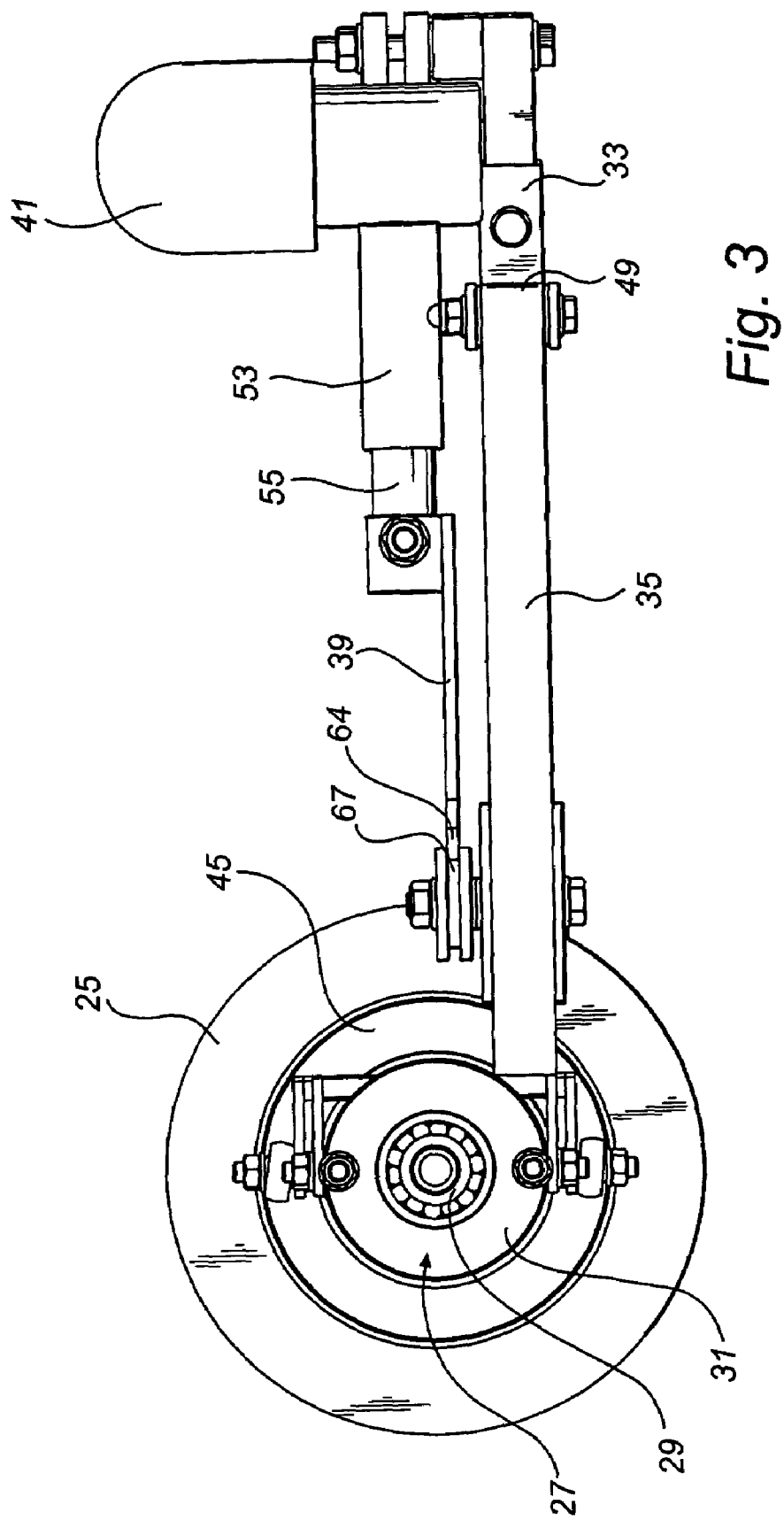
FIG. 3 is a schematic side view of the actuator in FIG. 2.

The construction of the clamping power actuator 21 will be elucidated in FIGS. 2 and 3, where the actuator 21, the primary variator 7 and a connection between them are illustrated. The primary variator 7 comprises a pulley with a fixed pulley half 23, which is fixedly connected to the crankshaft 13, and a movable pulley half 25, which is axially displaceably connected to the crankshaft 13. The movable pulley half 25 thus is displaceable along the crankshaft 13 but is entrained in the rotation of the crankshaft 13 by drivers mounted on the crankshaft 13, which however are concealed in the Figures by the movable pulley half 25. The actuator 21 comprises a holding-up means 27 which is arranged at a fixed distance from the fixed pulley half 23 at the end of the crankshaft 13. The holding-up means 27 comprises a bearing 29 mounted on the crankshaft 13 and a bearing holder 31 connected to the bearing 29. The actuator 21 further comprises a first operating arm 33, a second operating arm 35, a piston cylinder assembly 37, a setting arm 39 and a shifting motor 41.

The first operating arm 33 is pivotally connected to the movable pulley half 25 by the operating arm 33 at one end 43 being pivotally connected to a bearing 45, which in turn is connected to the movable pulley half 25.

The second operating arm 35 is at one end 47 pivotally connected to the bearing holder 31 of the holding-up means 27. The second operating arm 33 is at its other end 49 pivotally connected to the first operating arm via a link 51.

The piston cylinder assembly 37 is connected to the shifting motor 41, which drives the reciprocating piston motion of the piston cylinder assembly 37. The piston rod 55 of the piston cylinder assembly 37 is at its free end connected to the setting arm 39. The cylinder 53 of the piston cylinder assembly 37 is at one end pivotally connected to the other end 57 of the first operating arm 33.

The setting arm 39 is elongate and comprises first and second guide portions 59 and 61 respectively, which abut against abutment portions 58, 60 of the operating arms 33, 35. More specifically, the first guide portion 59 abuts against a first abutment portion 48 which constitutes a portion of the bottom of a groove in a first wheel 63 which is rotatably mounted on the first operating arm 33. The second guide portion 61 abuts against a second abutment portion 60 which constitutes a portion of the bottom 67 (see also FIG. 3) of a groove in a second wheel 65, which is rotatably mounted on the second operating arm 35. The first and second guide portions 59, 61 constitute portions of a first straight edge surface 62 and, respectively, a second opposite edge surface 64 of the setting arm 39. The second edge surface 64 is not parallel to the first but is either curved or angled in the longitudinal direction of the setting arm, so that the width of the setting arm 39, over a distance of the setting arm 39, increases from its front end 38 towards its rear end 40.

By the reciprocating motion of the piston 55, the setting arm 39 is displaceable back and forth between the wheels 63, 65. This makes the distance between the wheels 63, 65 adjustable.

Figure 4:
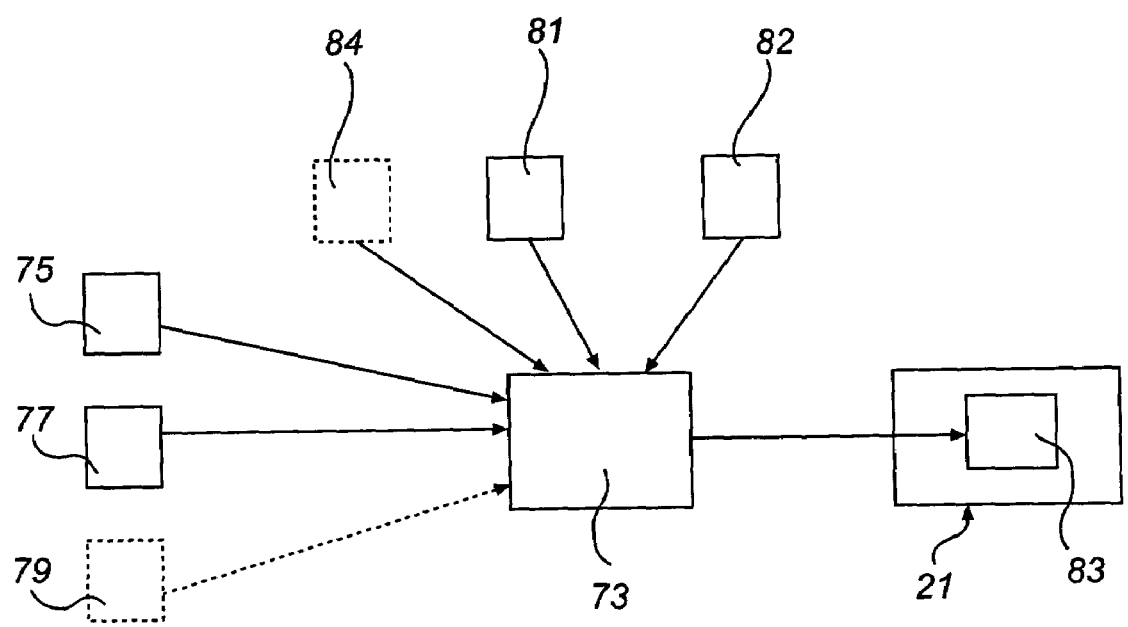
FIG. 4 is a block diagram of an embodiment of the control device according to the invention.

The clamping power actuator 21 constitutes a part of a control device which is shown in the form of a block diagram in FIG. 4. The control device further comprises an electronic control unit 73, a plurality of sensors, which consist of an engine speed sensor 75, a power sensor 77, a locking switch 81 and an operating mode selector 82. The control unit 73 is connected to all the other parts included in the control device. As an extra alternative, it is in any case possible to arrange a throttle sensor 79, which will be explained in more detail below.

The control device 71 operates as follows. The control unit 73 collects electronic measured values in the form of, for example, voltage signals, PWM signals, pulse trains, etc, from the sensors 75, 77 (and 79), processes them, generates a control value and supplies it to the actuator 21. The actuator 21 comprises a motor drive unit 83 which receives the control value and, based on the control value, drives the shifting motor 41 forwards or backwards or makes it stand still. The shifting motor 41 in turn drives the piston cylinder assembly 37, so that the piston 39 moves either forwards/outwards or backwards/inwards or does not move at all. As the piston 55 moves forwards and drives the setting arm 39, the width of the setting arm portion positioned between the wheels 63, 65 increases, i.e. the distance between the guide portions 59, 61 which abut against the wheels 63, 65 increases.

More specifically, the engine speed sensor 75 generates a measured value, which varies with the speed of the internal combustion engine 3. In this embodiment, the control unit 73 converts the signal from the engine speed sensor 75 to a measured value in the form of a percentage between 0 and 100%, which corresponds to an operating range of the engine 3. If, for instance, the operating range is determined to be 2,000-6,000 rpm, 0% corresponds to 2,000 rpm and 100% corresponds to 6,000 rpm. The power sensor 77 consists in this embodiment of four strain gages 77, which are linked in a full-bridge architecture and arranged two on each side of the first operating arm 33. The power sensor 77 will then be actuated when the operating arms 33, 35 are forced apart by the setting arm 39. The force exerted by the setting arm 39 on the wheels 63, 65 to force the operating arms 33, 35 apart produces via the movable pulley half 25 a clamping power on the pulley 11. The clamping power is in turn related to a corresponding clamping power in the secondary variator 9. Since the clamping power in the secondary variator is in turn related to the torque of the output drive shaft, the measured value generated by the power sensor 77 is also related to said torque. The control unit 73 converts also this sensor signal to a percentage measured value, where 0% corresponds to the minimum clamping power, i.e. 0 N, while 100% corresponds to the maximum clamping power, for instance 3,000 N.

The control unit 73 strives to control the transmission so that a relationship between the measured values from the sensors 75, 77 is achieved. The relationship is given by predetermined operating conditions which are indicated in an operating template. There are different operating modes which the driver can select by means of the operating mode selector 82. The different operating modes correspond to different operating templates and produce different characters in the shifting of the transmission. The control unit 73 starts from the engine speed and compares the measured value thereof with the measured value of the clamping power. If the clamping power at the current speed is below what has been determined in the currently selected operating template, the control unit 73 produces a control signal to the motor drive unit 83 to drive the shifting motor 41 in a direction that increases the clamping power, i.e. that forces the operating arms 33, 35 further apart. Consequently, each engine speed corresponds to a predetermined clamping power between the pulley halves 23, 25 of the primary variator 7. In a basic operating mode, a certain percentage of the speed corresponds to the same percentage of the clamping power. There are also operating modes with non-linear relations between the speed and the clamping power. The driver of the snowmobile can himself at any time change the operating mode among the predetermined operating modes by means of the operating mode switch 82.

The control signal also contains information about how quickly the change is to occur. If the difference between the current measured value of the clamping power and the desired value according to the operating template is great, the setting arm 39 is driven more quickly than in the case of a small difference. New measured values are read continuously by the control unit 73. In this embodiment it is also possible to vary the setting character of the actuator 21. This is done by programming in the control unit 73 and, more specifically, in a control program executed by the control unit 73. As an alternative, the control unit 73 may use, in addition to the speed and the clamping power, a measured value from the throttle sensor 79. In this embodiment the throttle sensor 79 generates a measured value in the form of a voltage signal, where the lowest voltage corresponds to idling and the highest voltage corresponds to full throttle. The additional information about the position of the throttle lever can then be used to make controlling more sensitive and quicker. If the position of the throttle lever is known, it is known in which direction the driver wishes to drive the engine speed, and it is then possible to operate the actuator faster, i.e. the clamping power can be increased/decreased more rapidly. On the other hand, this may result in an operating behavior that is experienced as nervous if the operation of the actuator is too fast. However, it is possible to choose to merely activate the increased operation rate in an extreme position of the throttle lever which is close to maximum. It is then desirable to perform a quick downshift, and a kind of kick-down function is executed. For instance the control unit 73 can determine the magnitude of the change of the position of the throttle lever per unit of time and use the result to determine the magnitude of the downshift. The control unit 73 then controls the actuator 21 accordingly.

The locking switch 81 is used to lock the control unit 73 so that the current gear ratio is maintained even if the engine speed changes. This function can be used, among other things, to increase the engine brake and to produce an engagement speed which is increased in relation to what is determined by the current operating mode. The latter may result in a quicker start in a race when the speed of the engine 3 of the snowmobile can be allowed to increase to a speed desired by the driver before engagement occurs and the drive of the track 19 thus begins.

Alternative Embodiments

The above description merely constitutes a non-limiting example of how the device according to the invention can be designed. Many modifications are conceivable within the scope of the invention as defined in the appended claims. A few examples of such modifications will follow below.

The control of the CVT is based on one or more sensor values. In a most simple form only a primary speed sensor, such as the engine speed sensor 75, is provided. On condition that the actuator acts on the primary variator for fully controlling the distance between the pulley halves, i.e. including engagement and disengagement of the belt, this is acceptable for some kinds of vehicles, where a precise control of the gear ratio is not a critical issue.

According to an alternative embodiment of the control device, the primary speed sensor 75 is combined with a secondary speed sensor 84, as indicated with dashed lines in FIG. 4. Thereby the gear ratio of the transmission is controlled. This is enough in yet further applications, while the combination of primary speed sensor 75 and power sensor, as described above, provides a load adaptive control, which is more useful and precise in some applications.

In embodiments where a plurality of sensors are used, alternatively, the control unit is programmed to detect sensor failures and disregard from the values received from a defective sensor. Then the control unit basis its control on the measured values from the remaining correctly working sensor or sensors.

Figure 5:
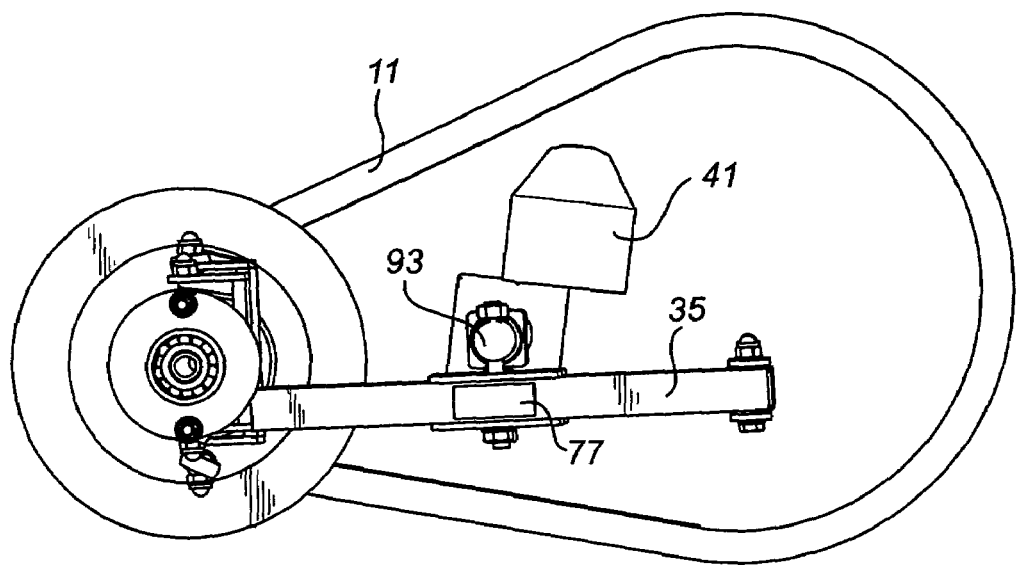
FIGS. 5 and 6 schematically illustrate in a side view and a top plan view, respectively, an alternative embodiment of the actuator.
Figure 6:
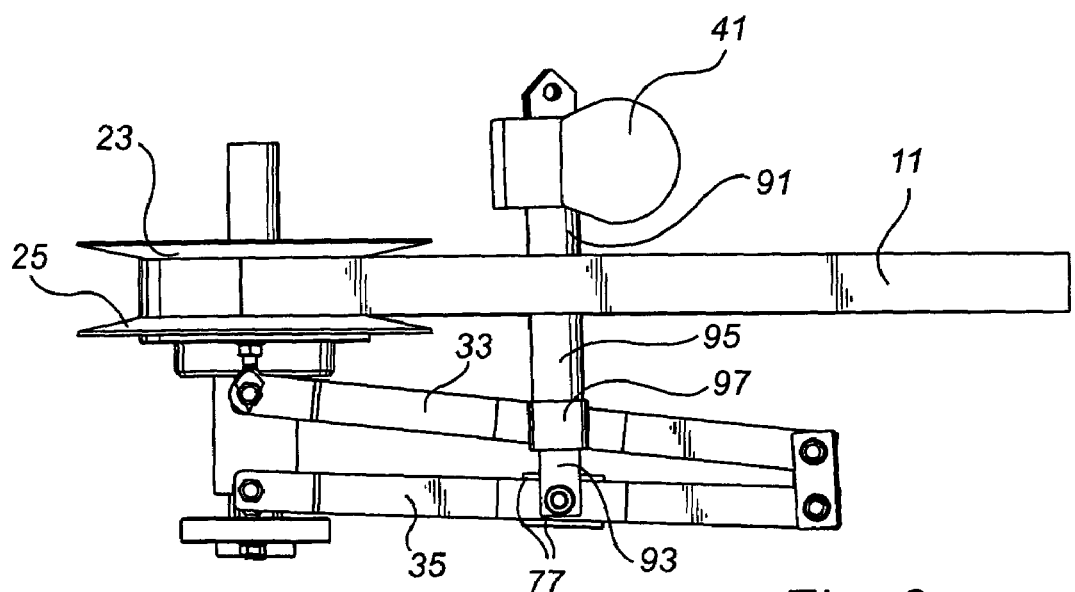

FIGS. 5 and 6 illustrate an alternative embodiment of the actuator. The parts that are equivalent to those in the embodiment shown in FIGS. 2 and 3 have been given the same reference numerals. The setting arm 91 here comprises a center shaft 93 which at one end is pivotally connected to the second operating arm 35, and at its other end is fixedly connected to the housing of the shifting motor 41. The setting arm 91 further comprises a sleeve 95 which is rotatably mounted on the center shaft 93 and externally mounted in a holder 97 arranged on the first operating arm 33. The sleeve 95 is rotatable but not axially displaceable in the holder 97. Moreover, at least a portion of the sleeve 95 is provided with an inner thread, while the center shaft 93 is provided with a corresponding outer thread that engages the inner thread of the sleeve 95. The sleeve 95 is also connected to the shifting motor 41. The shifting motor 41 rotates the sleeve 45, the threaded construction moving it along the center shaft 93 and thus entraining the first operating arm 33 so that the distance between the movable pulley half 25 and the fixed pulley half 23 is changed.

An alternative to arranging the power sensor on an operating arm is to provide the output drive shaft with a power sensor that measures the torque directly on the shaft. This is achieved, for example, by the shaft being designed so that the current torque causes a suitable rotation of the shaft. The rotation is measured by measuring a dislocation of position sensors at both ends of the shaft. The V-belt CVT according to the invention is usable not only in snowmobiles, but also in many other types of vehicle. A common feature is that the operating conditions are extreme insofar as the drive wheel or drive wheels, the track, the drive belt etc. encounters significantly more varying grounds than a common road vehicle. One example is a four-wheel off-road motorcycle where at one time little energy is required to drive it on hard and dry ground on a slight uphill slope, and at the next moment the drive wheels are running in mud and the inclination is greater. The combination of the measured values of engine speed and clamping power, which ultimately constitute a measure of the energy transmitted to the drive wheels, then allows rapid and smooth automatic adjustment to the new operating conditions.

It should be noted that the sensors described above can be electronic or electromechanical, wherein, for example, a mechanical, pneumatic or hydraulic part is used for catching a parameter and a converting part performs a conversion into an electronic output, that is then received and processed by the control unit. As a consequence, a sensor can be a compact unit as well as a distributed structure where a converting part is located at a distance from the rest of the sensor, for example close to the control unit.

It should be emphasized that the embodiments described above are only non-limiting examples. Many other variants are conceivable within the scope of the invention as defined in the claims. As additional examples of alternatives, mention can be made of other engine types, other variator constructions, etc.

The invention claimed is:

1. A control device for controlling a V-belt CVT which is connectible to a vehicle engine and comprises a primary variator and a secondary variator, the control device having at least one sensor which generates an electronic measured value, said at least one sensor being selected from a group of sensors comprising a primary speed sensor, sensing the engine speed or a speed proportional thereto, a secondary speed sensor, sensing the speed of the secondary variator or a speed proportional thereto, a power sensor generating a measured value related to the torque of an output drive shaft connected to the secondary variator, and a throttle sensor and an electronic control unit for controlling the V-belt CVT based on said measured values, wherein the control device further comprises a clamping power actuator which is connected to the control unit and connectable to the primary variator, wherein the clamping power actuator is arranged to set the V-belt clamping power of the primary variator, wherein the control unit's control of the V-belt CVT comprises control of the clamping power actuator, and wherein the control unit is arranged to command the clamping power actuator to switch on the primary variator at a settable first engine speed and to set the actuator to maximum clamping power at a settable second engine speed.

2. A control device as claimed in claim 1, wherein said at least one sensor comprises said power sensor, which generates a measured value representing one of a V-belt clamping power of the primary variator, and the torque which is exerted on the output drive shaft.

3. A control device as claimed in claim 1, wherein the control unit controls the CVT so that a predetermined relationship between the measured values is achieved in each operating situation.

4. A control device as claimed in claim 3, wherein the control device is settable in different operating modes which give different relationships between the measured values in a specific operating situation.

5. A control device as claimed in claim 1, further comprising a locking switch which is switchable to a locking position where it locks the actuator in its current position.

6. A V-belt CVT which is connectable to a vehicle engine, said V-belt CVT comprising a primary variator and a secondary variator, and a control device for controlling the V-belt CVT, the control device having at least one sensor which generates an electronic measured value, said at least one sensor being selected from a group of sensors comprising a primary speed sensor, sensing the engine speed or a speed proportional thereto, a secondary speed sensor, sensing the speed of the secondary variator or a speed proportional thereto, a power sensor generating a measured value related to the torque of an output drive shaft connected to the secondary variator, and a throttle sensor, and an electronic control unit for controlling the V-belt CVT based on said measured values, wherein the control device further comprises a clamping power actuator which is connected to the control unit and connectable to the primary variator, wherein the clamping power actuator is arranged to set the V-belt clamping power of the primary variator, wherein the control unit's control of the V-belt CVT comprises control of the clamping power actuator, and wherein the control unit is arranged to command the clamping power actuator to switch on the primary variator at a settable first engine speed and to set the actuator to maximum clamping power at a settable second engine speed.

7. A V-belt CVT as claimed in claim 6, wherein the primary variator comprising a pulley with a fixed pulley half which is fixedly connectible to the crankshaft of the vehicle engine, and a movable pulley half which is displaceably connectible to the crankshaft, wherein the actuator comprises a holding-up means which is arranged at a fixed distance from the fixed pulley half, a first operating arm which is connected to the movable pulley half, a second operating arm which is connected to the holding-up means, and a setting arm for setting the distance between the operating arms.

8. A V-belt CVT as claimed in claim 7, wherein the setting arm is elongate and comprises spaced-apart first and second guide portions which abut against abutment portions of the first and the second operating arms respectively, that the distance between the guide portions increases away from one end of the setting arm towards its other end, and that the setting arm is movable back and forth in its longitudinal direction.

9. A method for controlling a V-belt CVT which is connected to a vehicle engine and comprises a primary variator, a clamping power actuator which is connected to a control unit and to the primary variator for setting the V-belt clamping power of the primary variator, and a secondary variator, comprising:

the step of detecting and generating at least one electronic measured value related to at least one of the speed of the vehicle engine, the speed of the secondary variator, the torque of an output drive shaft connected to the secondary variator, and a throttle; and controlling the V-belt CVT based on said at least one measured value, comprising commanding the clamping power actuator to switch on the primary variator at a settable first engine speed and to set the actuator to maximum clamping power at a settable second engine speed.

10. A control device for controlling a V-belt CVT, which is connectible to a vehicle engine and comprises a primary variator and a secondary variator, the control device having at least one sensor generating an electronic measured value, said at least one sensor being selected from a group of sensors comprising a primary speed sensor, sensing the engine speed or a speed proportional thereto, a secondary speed sensor, sensing the speed of the secondary variator or a speed proportional thereto, a power sensor generating a measured value related to the torque of an output drive shaft connected to the secondary variator, and a throttle sensor, wherein the control device further comprises an electronic control unit for controlling the V-belt CVT based on said electronic measured value, and a clamping power actuator which is connected to the control unit and connectible to the primary variator, wherein the electronic control unit sets the V-belt clamping power of the primary variator by means of the clamping power actuator, wherein said clamping power actuator comprises a first operating arm, which is connectable to a movable pulley half of said primary variator, a shifting motor, which is connected to said first operating arm, and a motor drive unit, which is connected to said shifting motor and to said electronic control unit.

11. A control device as claimed in claim 10, wherein said at least one sensor consist of the primary speed sensor.

12. A control device as claimed in claim 10, wherein said at least one sensor consist of the primary speed sensor and the secondary speed sensor.

13. A control device as claimed in claim 10, wherein said at least one sensor consist of the primary speed sensor and the power sensor.

14. A control device as claimed in claim 10, wherein the control unit is operable to command the clamping power actuator to switch on the primary variator at a settable first engine speed and to set the actuator to maximum clamping power at a settable second engine speed.

15. A V-belt CVT which is connectible to a vehicle engine, said V-belt CVT comprising a primary variator and a secondary variator, and a control device for controlling said V-belt CVT, the primary variator comprising a pulley with a fixed pulley half which is fixedly connectible to the crankshaft of the vehicle engine, and a movable pulley half which is displaceably connectible to the crankshaft, and the control device having at least one sensor generating an electronic measured value, said at least one sensor being selected from a group of sensors comprising a primary speed sensor, sensing the engine speed or a speed proportional thereto, a secondary speed sensor, sensing the speed of the secondary variator or a speed proportional thereto, a power sensor generating a measured value related to the torque of an output drive shaft connected to the secondary variator, and a throttle sensor, wherein the control device further comprises an electronic control unit for controlling the V-belt CVT based on said electronic measured value, and a clamping power actuator which is connected to the control unit and to the primary variator, wherein the electronic control unit sets the V-belt clamping power of the primary variator by means of the clamping power actuator, wherein said clamping power actuator comprises a first operating arm, which is connected to the movable pulley half of said primary variator, a shifting motor, which is connected to said first operating arm, and a motor drive unit, which is connected to said shifting motor and to said electronic control unit.

16. A V-belt CVT as claimed in claim 15, wherein the clamping power actuator comprises a holding-up means which is arranged at a fixed distance from the fixed pulley half, a second operating arm which is connected to the holding-up means, and a setting arm for setting the distance between the operating arms, wherein said shifting motor is connected to said first operating arm via said setting arm.

17. A control device as claimed in claim 1, further comprising a locking switch which is switchable to a locking position where it locks the actuator in its current position.

18. A V-belt CVT as claimed in claim 16, wherein the setting arm is elongate and comprises spaced-apart first and second guide portions which abut against abutment portions of the first and the second operating arms respectively, the distance between the guide portions increasing away from one end of the setting arm towards its other end, and the setting arm being movable back and forth in its longitudinal direction.

* * * * *